United States Patent
Campbell

(10) Patent No.: US 6,644,515 B1
(45) Date of Patent: Nov. 11, 2003

(54) FILTER-VALVE ASSEMBLY

(76) Inventor: Michael C. Campbell, 1696 Dey Cove Dr., Virginia Beach, VA (US) 23454

( * ) Notice: Subject to any disclaimer, the term of this patent is extended or adjusted under 35 U.S.C. 154(b) by 0 days.

(21) Appl. No.: 10/093,376

(22) Filed: Mar. 11, 2002

(51) Int. Cl.$^7$ ............................................. F16K 24/04
(52) U.S. Cl. .................. 222/189.09; 141/286; 141/351; 137/43
(58) Field of Search ................. 222/189.06, 189.09, 222/189.11, 83.5, 87; 141/51, 286, 351–354, 329, 330; 137/43

(56) References Cited

U.S. PATENT DOCUMENTS

| | | | |
|---|---|---|---|
| 1,718,985 A | * 7/1929 | Scoville ..................... 222/383.1 |
| 4,834,267 A | * 5/1989 | Schroer et al. ........... 222/185.1 |
| 5,265,762 A | 11/1993 | Campbell et al. |
| 5,284,997 A | 2/1994 | Spearman et al. |
| 5,727,498 A | * 3/1998 | Hackler et al. ............. 116/206 |
| 5,775,362 A | * 7/1998 | Sato et al. .................... 137/202 |
| 5,979,709 A | * 11/1999 | Liccioni .................... 222/185.1 |
| 5,992,475 A | 11/1999 | Campbell |
| 6,450,192 B1 | * 9/2002 | Romanek ..................... 137/202 |

* cited by examiner

*Primary Examiner*—J. Casimer Jacyna
(74) *Attorney, Agent, or Firm*—Birch, Stewart, Kolasch & Birch, LLP

(57) ABSTRACT

A filter-valve assembly for exhausting fumes from a liquid container includes a mounting-valve assembly having a valve poppet that is moved to an open position in response to a filter-cartridge assembly being attached to a valve-assembly housing by a filter-cartridge attaching mechanism and is moved to a closed position in response to the filter-cartridge assembly being detached from the valve housing. The filter-cartridge assembly includes a coalescing filter and a carbon filter, with an orientation-activated cap-size valve located in a coalescing-filter housing for preventing spills upon capsizing and litmus-like material at an exit opening of a carbon-filter housing for indicating a need to replace the carbon filter.

21 Claims, 2 Drawing Sheets

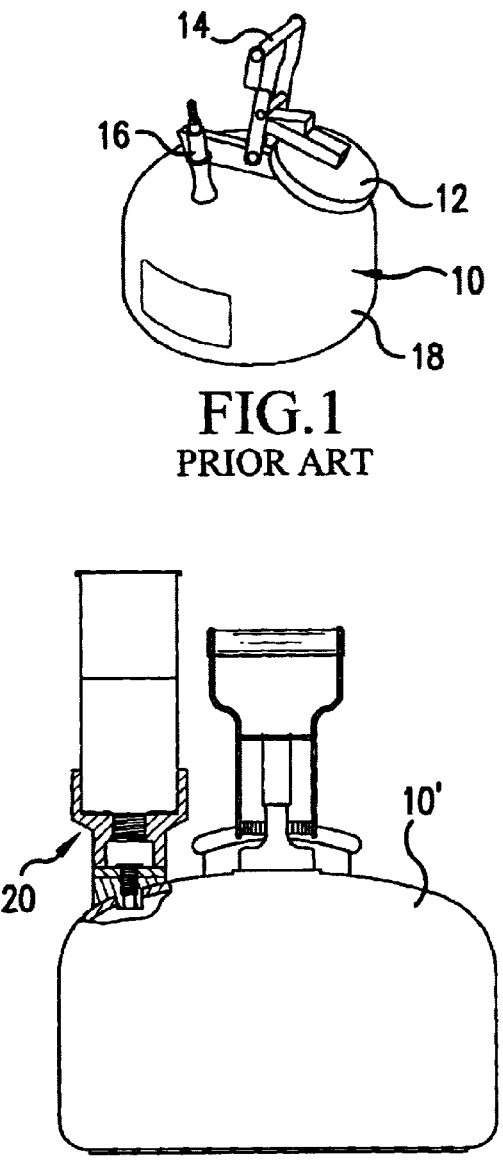
FIG.1
PRIOR ART
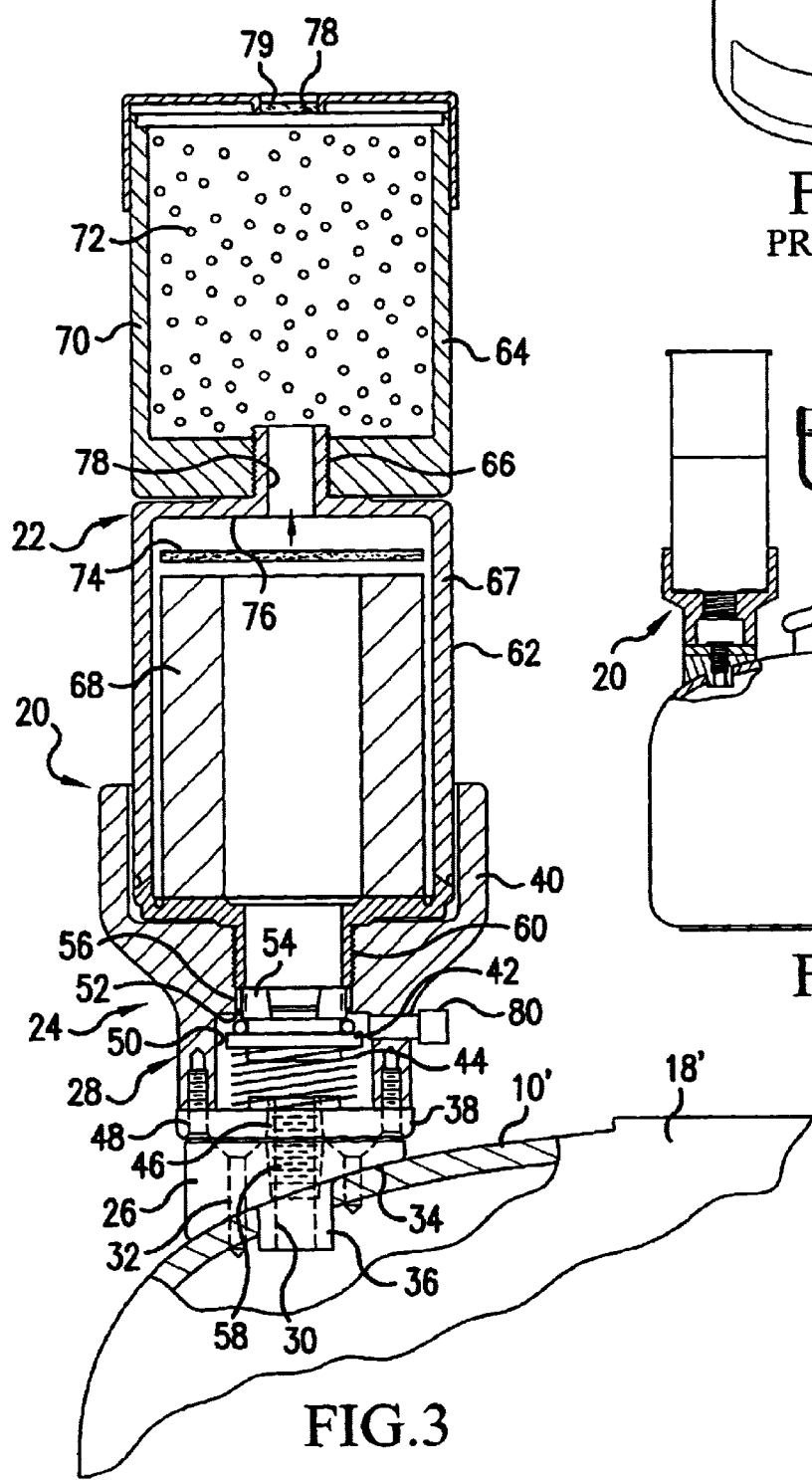
FIG.2
FIG.3

FILTER-VALVE ASSEMBLY

BACKGROUND OF THE INVENTION

This invention relates generally to the art of hazardous-waste disposal and more specifically to a system for protecting people from fumes given off by discarded chemical liquids.

Many laboratories, both industrial and academic, discard large amounts of hazardous chemical liquids on a continuous basis. Such hazardous liquids are often continuously drained into hazardous-liquid containers through tubes, and when the hazardous-liquid containers are filled they are emptied. Because such collection containers must be vented to allow proper drainage, they often give off noxious gases, which are released into the atmosphere thereby polluting air breathed by personnel working around the hazardous-liquid collection containers. In addition to being offensive, these fumes can also be flammable, and therefore quite dangerous.

Thus, it is an object of this invention to appropriately clean fumes and gases escaping from discarded liquids in hazardous-liquid collection containers.

Another dangerous problem related to such hazardous-liquid collection containers is that when they are capsized the hazardous liquids therein escape through exhausts and other openings. Thus, it is another object of this invention to provide an exhaust-opening assembly for a hazardous-liquid collection container that not only reliably cleans noxious fumes escaping from the containers but which also prevents the hazardous liquids themselves from spilling from the containers if they are capsized.

It is still another object of this invention to provide a filter assembly for a hazardous-liquid collection container that informs users when carbon of a filter thereof is exhausted.

Further, it is an object of this invention to provide a filter-valve assembly for hazardous-liquid collection containers that does not allow passage of noxious fumes when a filter-cartridge assembly thereof is removed.

SUMMARY OF THE INVENTION

According to principles of this invention, an exhaust-opening assembly for exhausting fumes from a hazardous-liquid collection container includes a filter-valve assembly that includes a valve poppet that is moveable to an open position in response to a filter-cartridge assembly being attached to a mounting-valve-unit housing by a filter-cartridge attaching mechanism and that is allowed to be moved by a resilient biasing device to a closed position in response to the filter-cartridge assembly being detached from the mounting-valve-unit housing.

In one embodiment, the valve poppet has fingers extending along an exit passage, which engage a neck portion of the filter-cartridge assembly when the filter-cartridge assembly is screwed into the exit passage to move the valve poppet away from a valve seat. When the filter-cartridge assembly is removed, the resilient biasing device presses the valve poppet against the valve seat for closing the exit passage.

The mounting-valve-unit housing extends about a substantial outer portion of the filter-cartridge assembly for protecting the filter-cartridge assembly upon the hazardous-liquid collection container capsizing.

The filter-cartridge assembly includes an orientation-responsive shut-off valve to prevent flow of hazardous liquids through filter-cartridge housings upon capsizing and litmus-like material, which can be seen from outside the housings, to inform users when carbon of a carbon filter element is exhausted.

In a preferred embodiment, the filter-cartridge assembly is divided into a first-stage coalescing filter and a second-stage carbon filter, with the orientation-responsive valve being in a coalescing-filter housing and the litmus-like material being at an exit end of a carbon-filter housing.

BRIEF DESCRIPTION OF THE DRAWINGS

The invention is described and explained in more detail with reference to the drawings. The described and drawn features can be used individually or in preferred combinations in other embodiments of the invention. The foregoing and other objects, features and advantages of the invention will be apparent from the following more particular description of the invention, as illustrated in the drawings in which reference characters refer to the same parts throughout the different views. The drawings are not necessarily to scale, emphasis instead being placed upon illustrating principles of the invention in a clear manner.

FIG. 1 is an isometric view of a prior art hazardous-liquid collection container;

FIG. 2 is a side, partially cutaway, view of a hazardous-liquid collection container with a filter-valve assembly of this invention attached thereto, with portions thereof removed for simplicity;

FIG. 3 is an enlarged segmented view of a hazardous-liquid collection container with a filter-valve assembly of this invention attached thereto, the filter-valve assembly being shown in partial cross section;

DETAILED DESCRIPTION OF THE INVENTION

Figure 7:
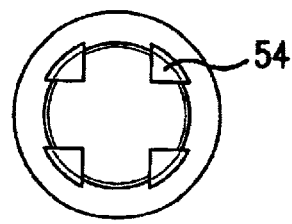
FIG. 7 is a top view of the valve poppet of FIG. 6.

A hazardous-liquid collection container 10 of a type used in the prior art is depicted in FIG. 1. As can be seen in FIG. 1 this collection container includes a cover 12 that can be opened by movement of a handle 14 and a liquid inlet nipple 16 for being attached to a hose, or tube, for allowing hazardous liquids to drain into a tank 18 of the collection container 10. The hazardous liquids in the tank 18 give off noxious gases, which develop pressure and escape from the tank 18 at a vent and around the cover 12, thereby contaminating surrounding air, both being objectionable and dangerous to personnel.

FIG. 2 depicts a similar hazardous-liquid collection container 10' having a filter-valve assembly 20 of this invention attached thereto. In this regard, in FIG. 2 the filter-valve assembly 20 is shown in a simplified form, with parts removed, but it is shown in more detail in the enlarged view of FIG. 3. The filter-valve assembly 20 serves as an exhaust, or vent, opening assembly.

The filter-valve assembly 20 basically includes a filter-cartridge assembly 22 and a mounting-valve assembly 24.

The mounting-valve assembly 24 includes a mounting adaptor 26 and a mounting-valve unit 28.

With regard to the mounting adaptor 26, this element is essentially a block of aircraft aluminum defining a central entrance bore 30 and four screw bores 32. As can be seen in FIG. 3, the mounting adaptor 26 has a curved contoured side 34 for conforming to a curved contour of an upper shoulder of the collection container tank 18'. Protruding from a lower side 34 of the mounting adaptor 26 is a bottom plug portion 36 through which the central entrance bore 30 passes.

The mounting-valve unit 28 mainly includes a base plate 38, a mounting-valve-unit housing 40, a mounting-valve poppet 42 and a bias spring 44.

Figure 5:
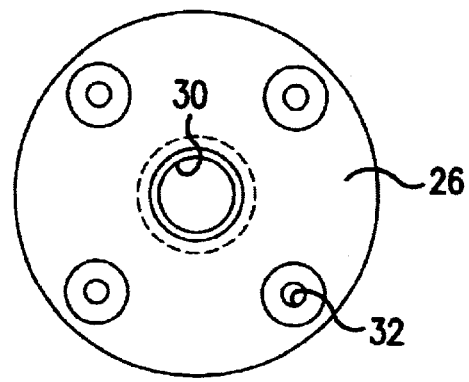
FIG. 5 is a top view of the mounting adaptor of FIG. 4.

The base plate 38 is basically a round disc of TEFLON having an outer diameter similar to an outer diameter of the mounting adaptor 26 (see FIG. 5), defining a central entrance bore 46 that aligns with the central entrance bore 30 of the mounting adaptor 26 and having bolt holes 48. As can be seen in the drawings, in the assembled condition, the base plate 38 is screwed to a lower end of the mounting-valve-unit housing 40 by screws in the boltholes 48. The somewhat resilient TEFLON forms a good seal with the mounting-valve-unit housing 40, while at the same time the TEFLON prevents the base plate 38 from becoming inadvertently adhered to the mounting-valve-unit housing 40 by adhesive-like vapors from chemicals in the tank 10'.

The mounting-valve-unit housing 40 is of aircraft aluminum coated inside and out with TEFLON. The aircraft aluminum gives this part strength and provides chemical resistance. The TEFLON coating also helps protect the mounting-valve-unit housing 40 from chemical attack, but in addition makes it easy to clean and improves its appearance.

Figure 6:
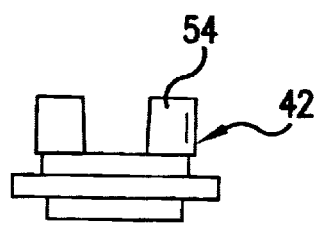
FIG. 6 is a side view of a valve poppet of the filter-valve assembly of FIG. 3.
Figure 4:
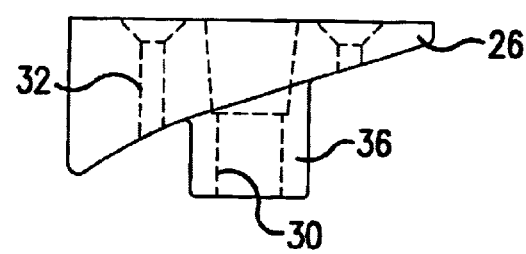
FIG. 4 is a side view of a mounting adaptor, which is part of the filter-valve assembly of FIG. 3.

The base plate 38 and the mounting-valve-unit housing 40 define a mounting-valve cavity 50 in which the mounting-valve poppet 42 and the bias spring 44 are located. This mounting-valve poppet 42 is likewise of aluminum covered with a layer of TEFLON. The bias spring 44 is held at its lower end by a protrusion on the base plate 38 and at its upper end by a protrusion on the mounting-valve poppet 42, with both protrusions extending into a center of the coiled bias spring 44. The bias spring 44 urges the mounting-valve poppet upwardly toward a valve seat 52 formed by the mounting-valve-unit housing 40, with an O-ring on the mounting-valve poppet 42 actually making contact with the valve seat 52. The mounting-valve poppet 42 is held stabilized in the center of the mounting-valve cavity 52 by fingers 54 thereof (see FIGS. 6 and 7 for more detail), which extend into an exit bore 56 defined by the mounting-valve-unit housing 40 leading out of the mounting-valve cavity 50.

A two-way beveled, threaded bolt 58 is screwed into the entrance bores 30 and 46 of the mounting adaptor 26 and the base plate 38 respectively when the filter-valve assembly 20 is assembled as depicted in FIG. 3.

The filter-cartridge assembly 22 is of a type sometimes referred to as a two-stage capsule filter; comprising a male threaded neck portion 60 for engaging female threads in an upper end of the exit bore 56 of the mounting-valve-unit housing 40. A bore of the neck portion 60 leads into a first-stage-filter housing 67 of a first-stage filter 62 of the filter-cartridge assembly 22. The first-stage-filter housing 67 is of a translucent polypropylene. On top of the first-stage filter 62 is a detachable second-stage filter 64 that, in the depicted embodiment, can be screwed onto an upper neck 66 of the first-stage filter 62. The description in U.S. Pat. 5,284,997 to Spearman et al. describes a similar filter assembly of this general type and the teachings of that patent are incorporated herein by reference.

Briefly, the first-stage filter 62 comprises a coalescing filter, in which small liquid droplets in a gaseous mixture combine to form larger droplets that are a sufficient size to accumulate in the first-stage filter housing 67, which accumulation can be seen through the translucent first-stage-filter housing 67. A coalescing filter member 68 and other filter members serve for causing the liquid accumulation.

The second-stage filter 64 comprises a one-piece second-stage filter housing 70, of polypropylene, containing granular carbon 72 held between downstream and upstream porous filter members, which prevent dust from getting into the carbon 72 and help hold the carbon 72 in place. As gaseous mixtures flow through the second-stage filter 64, the carbon 72 therein removes hazardous solvents in the gaseous mixture, thereby allowing gases, stripped of hazardous solvents, to discharge into the atmosphere. Thus, the carbon second-stage filter 64 removes hazardous solvents from the gaseous mixtures by retaining them within the carbon filter while the coalescing first-stage filter 62 separates droplets to facilitate removal of the hazardous solvents by the carbon filter.

However, the filter-cartridge assembly 22 is modified from those of the general type. Within the first-stage filter housing 67, at a downstream end of the coalescing filter member 68 (the top end as viewed in FIG. 3), there is a capsize-activated shut-off disc 74. If the tank 18' of the collector container 10' should capsize, or be turned over, downward gravity acting on the shut-off disc 74 would be lessened and the shut-off disc 74 would be driven by pressure and/or gravity against a valve seat 76 formed on an interior surface of the first-stage filter housing 67 about a bore 78 passing through the upper neck 66. Thus, flow of liquid from the tank 18' through and out of the first-stage filter 62 would be prevented by the orientation/capsize-activated shut-off disc 74 being seated on the valve seat 76.

A litmus-like material 78 is located at the downstream end of the second-stage filter 64 (the top end as viewed in FIG. 3) through which gases pass after the gases have passed through the granular carbon 72. If the granular carbon 72 has become exhausted, it removes fewer of the hazardous solvents and chemicals in gaseous mixtures and these solvents are then reacted to by the litmus-like material 78 by thereby changing in appearance (such as changing color). Thus, the color of the litmus-like material indicates to a user if it is time to replace the second-stage filter 64. It should be understood that the term "litmus-like" is used here to indicate any material that provides a visual indication of a presence of a particular substance.

Describing now operation of the filter-valve assembly 20, it will be first assumed, for ease of description only, that the filter-valve assembly is to be retrofitted to a prior-art hazardous-liquid collection container 10 of the type shown in FIG. 1 (normally, however, a filter-valve assembly of this invention will be installed on a collection container when the collection container is manufactured and not retrofitted to an existing container). Any vent in the tank 18 would be covered. Further, if such a retrofit were carried out, the liquid-drain nipple 16 would be removed from the tank 18 and a larger hole would be bored into the tank at the hole left by this removal. The bottom plug portion 36 of the mounting adaptor 26 would then be inserted into this hole and the mounting adaptor 26 attached to the modified tank 18' by an adhesive sealant and the four self-tapping stainless-steel screws (coated with a sealant adhesive) passing through the screw bores 32. The adhesive sealant would ensure a securely sealed base for attaching the mounting-valve unit 28 to the tank 18'. It is actually preferable that the hole in the tank 18' be placed further radially outwardly on the tank 18', more on its rounded shoulder, as shown in FIG. 3, and this is where it would normally be placed on a new manufacture. The curved, contoured lower surface of the mounting adaptor 26 is shaped to fit that portion of the tank 18' on which it is mounted.

The mounting-valve unit 28 is first assembled by placing the mounting-valve poppet 42 into the mounting-valve cavity 50, with the O-ring thereon, so that the fingers 54 of the mounting-valve poppet extend up into the exit bore 56 and then placing the bias spring 44 between the base plate 38 and the mounting-valve poppet 42. The base plate 38 is then screwed to a lower end of the mounting-valve-unit housing 40. The O-ring of the mounting-valve poppet 42 is biased against the valve seat 52. The base plate 38 is then attached to the mounting adaptor. 26 by the two-way beveled bolt 58, the beveled bolt being screwed into the top end of the entrance bore 30 of the mounting adaptor 26 and the bottom end of the entrance bore 46 of the base plate 38, so that the attached mounting-valve-unit housing 40 is screwed onto a top end of the two-way beveled bolt 58.

In this configuration, before the filter-cartridge assembly 22 is attached to the mounting-valve assembly 24, the mounting-valve poppet 42, which is seated on the valve seat 52, prevents both gases and liquids from passing through the exit bore 56.

However, when the filter-cartridge assembly 22 is attached to the mounting-valve assembly 24 by the neck portion 60 of the first-stage filter housing 67 being screwed into an upper end of the exit bore 56, an outermost end of the neck portion 60 comes into contact with the fingers 54 of the mounting-valve poppet 42 and urges the mounting-valve poppet 42 away from the valve seat 52, thereby moving the mounting-valve poppet to an open position in which gases can flow about the mounting-valve poppet 42 out the exit bore 56 through the filter-cartridge assembly 22. The filter-valve assembly 20 is now activated, or armed.

Should the hazardous-liquid collector container 10' be capsized, or inverted, the capsize-activated shut-off disc 74 will be automatically moved to the valve seat 76 by gravity and/or pressure, thereby preventing liquid from flowing to outside atmosphere through the filter-cartridge assembly 22. Similarly, the filter cartridge assembly 22 will be protected against breaking off by the high aluminum wall of the mounting-valve-unit housing 40 that extends about the lower end of the first-stage filter 62.

The litmus-like material 78, which can be observed through a translucent plastic disk 79 will inform user personnel when the granular carbon 72 is exhausted and the second-stage filter must be replaced.

Figure 8:
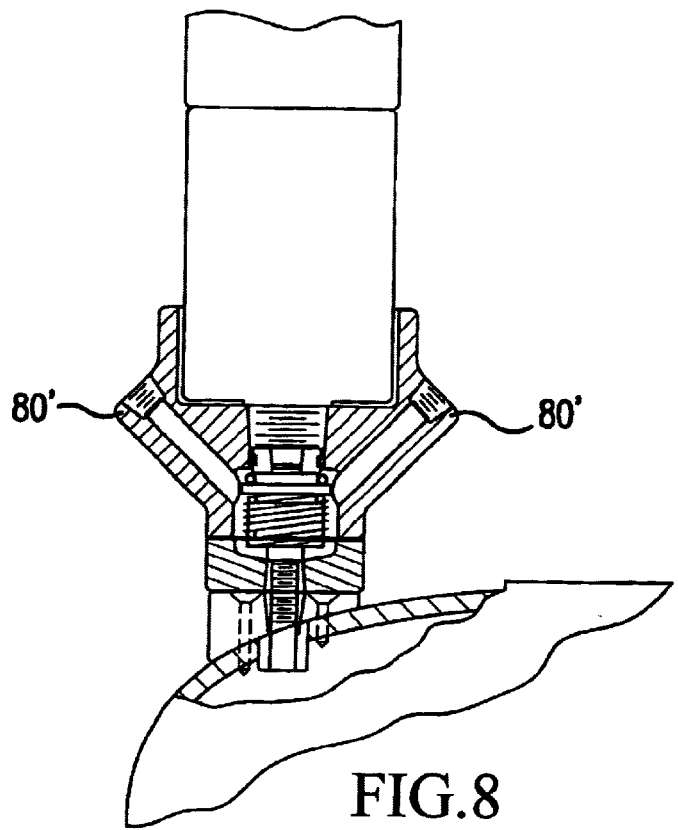
FIG. 8 is a view similar to FIG. 3 of a modified embodiment.

It should be noted that the filter-valve assembly 20 can still be used in the manner of the liquid-drain nipple 16 in the prior-art collector container 10 of FIG. 1 by placing a liquid-drain nipple 80 in the wall of the mounting-valve-unit housing 40 below the point at which the mounting-valve poppet 42 seats on the valve seat 52. Thus, liquid can still be drained into the tank 18' through the same hole as it was drained into the tank before the liquid-drain nipple 16 of the prior-art collector container 10 was replaced by the filter-valve assembly 20. In one embodiment of the invention there are actually two liquid-drain nipples 80' (see FIG. 8) feeding into the mounting valve cavity 50 space at an angle of 180 from one another so that more than one tube can drain into the tank 18'. In another embodiment they are spaced 45° from one another. It will be understood by those of ordinary skill in the art that even more nipples could be included for draining chemicals into the tank 18' via the mounting-valve cavity 50. In one embodiment the nipple 80 is a female attachment member of a quick-connect/disconnect. It should be noted that the filter-valve assembly 20 is serving as the vent for the hazardous-liquid collection container 10, but that it can only vent when the filter-cartridge assembly is attached.

Again, although the filter-valve assembly was discussed above in the context of a retrofit, it is normally installed on a collection container during manufacturing as an original component. Further, it is normally installed on a container radially further out on the curved shoulder of the container than are drain nipples of the prior art. Containers are stronger at their rounded shoulders. Further, the containers on which the filter-valve assembly is installed should not be otherwise vented.

It will be understood by those of ordinary skill in the art that the filter-valve assembly of this invention has many advantages. The mounting-valve poppet of the mounting-valve unit prevents the flow of gases, as well as liquids, from the tank 18' through the exit bore 56 if there is no filter-cartridge assembly 22 attached to the mounting-valve-unit housing.

Equally as important, a high side of the mounting-valve-unit housing 40 extending a substantial distance along the first-stage filter housing 67 (at least ⅕ of the way) protects the first-stage filter 62 from breaking if the collection container 10' falls from a table, for example. But, on the other hand, the side of the mounting-valve-unit 40 is not so high (not more than ½ of the way) that it prevents a user from looking into the translucent first-stage filter housing 40 to see if so much liquid has accumulated therein that the first-stage filter 62 must be replaced. In a preferred embodiment, the mounting-valve-unit housing 40 extends ¼ to ⅓ of the way up the first-stage filter housing 67.

Another important benefit of this invention is that chemicals cannot be drained into the tank 18' unless there is a filter-cartridge assembly 22 attached to the mounting-valve unit 28 because otherwise the mounting-valve poppet 42 is closed and the system is not vented to allow drain flow through the liquid drain nipple 80.

The mounting adaptor 26 with a lower curved, contoured, wall gives the entire filter-valve assembly 20 a stable and sealed seating, while at the same time holding the filter cartridge assembly vertical so as to be aesthetically pleasing.

The capsize-activated shut-off disc valve 74 prevents the flow of liquid from the tank 18' should the tank be capsized, even when the filter-cartridge assembly 22 holds the mounting-valve poppet 42 open.

The litmus-like material 78 informs users when they must replace the second-stage carbon filter 64

Although this invention has been described with reference to a preferred embodiment, it will be understood by those of ordinary skill in the art that many other arrangements are possible within the scope of the invention.

I claim:

1. A filter-valve assembly for exhausting fumes from a liquid container, said filter valve assembly comprising:
   a valve housing assembly having a first end for being attached to a filter-cartridge assembly and a second end for being attached to said liquid container, said valve housing assembly defining a valve -cavity having exit and entrance passages respectively at said first and second ends for communicating with said filter-cartridge assembly and said liquid container, and including a filter-cartridge attaching mechanism at said exit passage for attaching said filter-cartridge assembly to said valve-housing assembly at said first end, and a liquid-container attaching mechanism at said entrance passage for attaching said valve-housing assembly to said liquid container at said second end; and a mounting-valve unit in said valve cavity, said mounting-valve unit comprising a valve seat, a valve poppet for being seated against said valve seat in a closed position for preventing fluid flow between said entrance and exit passages and for being moved away from said valve seat in an open position for allowing fluid flow between said entrance and exit passages, and a resilient member for biasing said valve poppet against said valve seat to the closed position;

wherein said valve poppet is moved to said open position in response to said filter-cartridge assembly being attached to said valve-assembly housing by said filter-cartridge attaching mechanism and is allowed to be moved to said closed position by the resilient member in response to said filter-cartridge assembly being detached from said valve housing; and wherein said mounting-valve poppet has a finger extending along said exit passage and wherein said filter-cartridge attaching mechanism at said exit passage engages a neck of said filter-cartridge assembly, wherein when said neck is engaged by said filter-cartridge attaching mechanism said neck comes into contact with said finger and moves said mounting-valve poppet away from said valve seat.

2. A filter-valve assembly as in claim 1, wherein said filter-cartridge attaching mechanism includes female threads in said valve housing assembly for engaging male threads in said neck of said filter-cartridge assembly.

3. A filter-valve assembly as in claim 1, wherein said valve housing assembly extends along the side of said filter-cartridge assembly to cover a substantial portion of an exterior surface of said filter-cartridge assembly when said filter-cartridge assembly is attached to said housing assembly by said filter-cartridge attaching mechanism.

4. A filter-valve assembly as in claim 3, wherein said valve housing assembly includes a drain nipple for communicating with said valve cavity on a side of said valve seat away from said filter-cartridge assembly so that fluid can drain through said drain nipple and said valve housing assembly into said liquid container even if said mounting-valve poppet is in the closed position.

5. A filter-valve assembly as in claim 4, wherein said liquid-container attaching mechanism comprises a mounting adaptor having a curved side for snuggly seating against a contoured outer surface of the wall of said liquid container.

6. A filter-valve assembly as in claim 5, wherein said mounting adaptor is formed as a separate member from a mounting-valve-unit housing defining said valve cavity so that the mounting adaptor can be attached to the liquid container and the mounting-valve-unit housing can be attached to the mounting adaptor.

7. A filter-valve assembly as in claim 1, wherein said valve housing assembly includes a drain nipple for communicating with said valve cavity on a side of said valve seat away from said filter-cartridge assembly so that fluid can drain through said drain nipple and said valve housing assembly into said liquid container even if said mounting-valve poppet is in the closed position.

8. A filter-valve assembly as in claim 1, wherein said liquid-container attaching mechanism comprises a mounting adaptor having a curved side for snuggly seating against a contoured outer surface of the wall of said liquid container.

9. A filter-valve assembly as in claim 8, wherein said mounting adaptor is formed as a separate member from a mounting-valve-unit housing defining said valve cavity so that the mounting adaptor can-be attached to the liquid container and the mounting-valve-unit housing can be attached to the mounting adaptor.

10. A filter-valve assembly as in claim 1, wherein is further included as part of said filter-valve assembly said filter-cartridge assembly, said filter-cartridge assembly having a carbon filter with litmus-like material at an exit opening thereof for reacting to the presence of substances not sufficiently treated by carbon in the carbon filter by changing color, said litmus-like material thereby providing an indication of exhaustion of the carbon in the carbon filter.

11. A filter-valve assembly as in claim 10, wherein said filter-cartridge assembly further includes a capsize valve, which is closed in response to the liquid container on which the filter-valve assembly is mounted being capsized.

12. A filter-valve assembly as in claim 11, wherein said capsize valve is closed by force of gravity.

13. A filter-valve assembly as in claim 11, wherein said filter-cartridge assembly comprises a coalescing filter and said carbon filter, and wherein said capsize valve is located in a housing of the coalescing filter.

14. A filter-valve assembly as in claim 1, wherein is further included as part of said filter-valve assembly, said filter cartridge assembly, said filter-cartridge assembly further including a capsize valve, which is closed in response to the liquid container on which the filter-valve assembly is mounted being capsized.

15. A filter-valve assembly as in claim 14, wherein movement of said capsize valve is substantially influenced by force of gravity.

16. A filter-valve assembly as in claim 15, wherein said filter-cartridge assembly comprises a coalescing filter and a carbon filter, and wherein said capsize valve is located in a housing of the coalescing filter.

17. A filter-valve assembly for exhausting fumes from a liquid container, said filter-valve assembly comprising:

a filter-cartridge assembly for being attached to said liquid container, said filter-cartridge assembly including a capsize valve having a valve member which is closed in response to the liquid container being capsized;

wherein said filter-cartridge assembly comprises a coalescing filter and a carbon filter connected in series, said coalescing filter being connected upstream of said carbon filter, and wherein said capsize valve is located in a housing of the coalescing filter; and wherein said carbon filter has litmus-like material at an exit opening thereof for reacting to the presence of solvents not treated by carbon in the filter by changing color, said litmus-like material thereby providing an indication of exhaustion of the carbon in the carbon filter.

18. A filter-valve assembly for exhausting fumes from a liquid container, said filter valve assembly comprising:

a valve housing assembly having a first end for being attached to a filter-cartridge assembly and a second end for being attached to said liquid container, said valve housing assembly defining a valve cavity having exit and entrance passages respectively at said first and second ends for communicating with said filter-cartridge assembly and said liquid container, and including a filter-cartridge attaching mechanism at said exit passage for attaching said filter-cartridge assembly to said valve-housing assembly at said first end, and a liquid-container attaching mechanism at said entrance passage for attaching said valve-housing assembly to said liquid container at said second end; and a mounting-valve unit in said valve cavity, said mounting-valve unit comprising a valve seat, a valve poppet for being seated against said valve seat in a closed position for preventing fluid flow between said entrance and exit passages and for being moved a way from-said valve seat in an open position for allowing fluid flow between said entrance and exit passages, and a resilient member for biasing said valve poppet against said valve seat to the closed position;

wherein said valve poppet is moved to said open position in response to said filter-cartridge assembly being attached to said valve-assembly housing by said filter-cartridge attaching mechanism and is allowed to be moved to said closed position by the resilient member in response to said filter-cartridge assembly being detached from said valve housing; and wherein said valve housing assembly includes a drain nipple for communicating with said valve cavity on a side of said valve seat away from said filter-cartridge assembly so that fluid can drain through said drain nipple and said valve housing assembly into said liquid container even if said mounting-valve poppet is in the closed position.

19. A filter-valve assembly for exhausting fumes from a liquid container, said filter valve assembly comprising:

a valve housing assembly having a first end for being attached to a filter-cartridge assembly and a second end for being attached to said liquid container, said valve housing assembly defining a valve cavity having exit and entrance passages respectively at said first and second ends for communicating with said filter-cartridge assembly and said liquid container, and including a filter-cartridge attaching mechanism at said exit passage for attaching said filter-cartridge assembly to said valve-housing assembly at said first end, and a liquid-container attaching mechanism at said entrance passage for attaching said valve-housing assembly to said liquid container at said second end; and a mounting-valve unit in said valve cavity, said mounting-valve unit comprising a valve seat, a valve poppet for being seated against said valve seat in a closed position for preventing fluid flow between said entrance and exit passages and for being moved away from said valve seat in an open position for allowing fluid flow between said entrance and exit passages, and a resilient member for biasing said valve poppet against said valve seat to the closed position;

wherein said valve poppet is moved to said open position in response to said filter-cartridge assembly being attached to said valve-assembly housing by said filter-cartridge attaching mechanism and is allowed to be moved to said closed position by the resilient member in response to said filter-cartridge assembly being detached from said valve housing; and wherein said liquid-container attaching mechanism comprises a mounting adaptor having a curved side for snuggly seating against a contoured outer surface of the wall of said liquid container; and wherein said mounting adaptor is formed as a separate member from a mounting-valve-unit housing defining said valve cavity so that the mounting adaptor can be attached to the liquid container and the mounting-valve-unit housing can be attached to the mounting adaptor.

20. A filter-valve assembly for exhausting fumes from a liquid container, said filter valve assembly comprising:

a valve housing assembly having a first end for being attached to a filter-cartridge assembly and a second end for being attached to said liquid container, said valve housing assembly defining a valve cavity having exit and entrance passages respectively at said first and second ends for communicating with said filter-cartridge assembly and said liquid container, and including a filter-cartridge attaching mechanism at said exit passage for attaching said filter-cartridge assembly to said valve-housing assembly at said first end, and a liquid-container attaching mechanism at said entrance passage for attaching said valve-housing assembly to said liquid container at said second end; and a mounting-valve unit in said valve cavity, said mounting-valve unit comprising a valve seat, a valve poppet for being seated against said valve seat in a closed position for preventing fluid flow between said entrance and exit passages and for being moved away from said valve seat in an open position for allowing fluid flow between said entrance and exit passages, and a resilient member for biasing said valve poppet against said valve seat to the: closed position;

wherein said valve poppet is moved to said open position in response to said filter-cartridge assembly being attached to said valve-assembly housing by said filter-cartridge attaching mechanism and is allowed to be moved to said closed position by the resilient member in response to said filter-cartridge assembly being detached from said valve housing; and wherein is further included as part of said filter-valve assembly said filter-cartridge assembly, said filter-cartridge assembly having a carbon filter with litmus-like material at an exit opening thereof for reacting to the presence of substances not sufficiently treated by carbon in the carbon filter by changing color, said litmus-like material thereby providing an indication of exhaustion of the carbon in the carbon filter.

21. A filter-valve assembly for exhausting fumes from a liquid container said filter valve assembly comprising:

a valve housing assembly having a first end for being attached to a filter-cartridge assembly and a second end for being attached to said liquid container, said valve housing assembly defining a valve cavity having exit and entrance passages respectively at said first and second ends for communicating with said filter-cartridge assembly and said liquid container, and including a filter-cartridge attaching mechanism at said exit passage for attaching said filter-cartridge assembly to said valve-housing assembly at said first end, and a liquid-container attaching mechanism- at said entrance passage for attaching said valve-housing assembly to said liquid container at said second end; and a mounting-valve unit in said valve cavity, said mounting-valve unit comprising a valve seat, a valve poppet for being seated against said valve seat in a closed position for preventing fluid flow between said entrance and exit passages and for being moved away from said valve seat in an open position for allowing fluid flow between said entrance and exit passages, and a resilient member for biasing said valve poppet against said valve seat to the closed position;

wherein said valve poppet is moved to said open position in response to said filter-cartridge assembly being attached to said valve-assembly housing by said filter-cartridge attaching mechanism and is allowed to be moved to said closed position by the resilient member in response to said filter-cartridge assembly being detached from said valve housing; and wherein is further included as part of said filter-valve assembly, said filter cartridge assembly, said filter-cartridge assembly further including a capsize valve, which is closed in response to the liquid container on which the filter-valve assembly is mounted being capsized.

* * * * *